March 24, 1970     J. E. BRIDGES ET AL     3,502,967

SYSTEM FOR DETECTING TWIST AND BEND IN TURBINE BLADES

Filed May 27, 1968

INVENTORS
JACK E. BRIDGES
ANTON H. HEHN
RONALD B. SCHWAB

D. James Bader ATTY.

United States Patent Office 3,502,967
Patented Mar. 24, 1970

3,502,967
SYSTEM FOR DETECTING TWIST AND BEND IN TURBINE BLADES
Jack E. Bridges, Park Ridge, Anton H. Hehn, Chicago, and Ronald R. Schwab, Evergreen Park, Ill., assignors to IIT Research Institute, Chicago, Ill., a not-for-profit corporation of Illinois
Filed May 27, 1968, Ser. No. 732,263
Int. Cl. G01r 33/02
U.S. Cl. 324—34      9 Claims

ABSTRACT OF THE DISCLOSURE

A system for the detection of unusual twisting or bending of blades in a turbomachine. In its preferred embodiment the system contains two transducer heads positioned above a row of turbine blade tips so that one transducer detects the passing of one point and one detects the passing of another point of a given blade. The transducers are connected to a comparison circuit which in turn is connected to some visual display device so that a reading of the twist and deflection of the blades can be made while the turbine is in operation.

---

Figure 1:
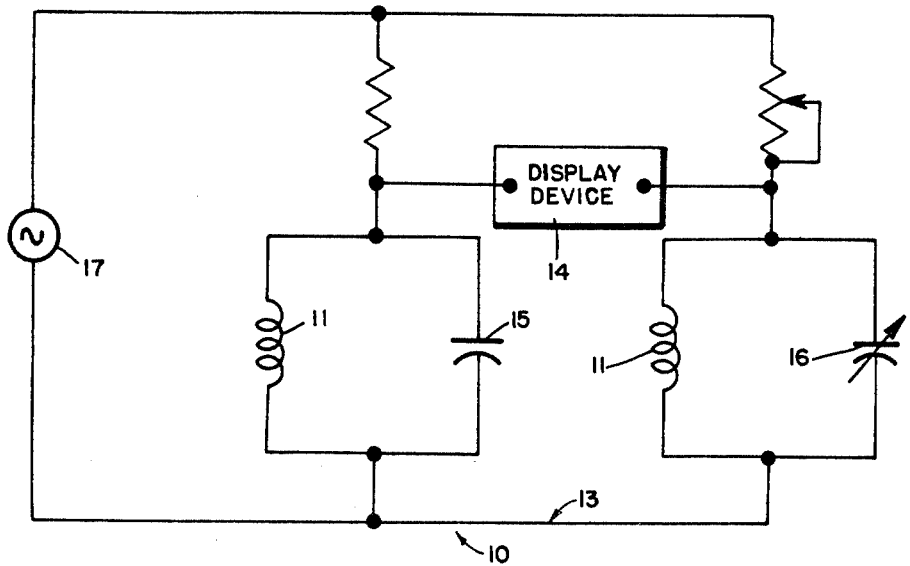

This invention relates generally to a system for detection of bending or twisting of turbine blades in a turbomachine while the machine is in operation. More particularly it relates to the detection of flaws in turbine blades prior to any danger of failure by the detection of unusual bending or twisting of the blade. The term turbomachine is one of general application. It relates to hydraulic machines having vanes or blades in which the fluid has a velocity relative to the vanes or blades. Typical examples of such devices are jet engines, centrifugal and axial flow pumps or compressors. The inventive concept disclosed herein is not limited in its use to any particular type of turbomachine. The greatest value of a monitoring system will obviously be found in situations where the blades are not easily accessible either because they are enclosed in a housing or because they operate as in a jet plane in an environment unsuitable for physical observation. Since the system disclosed herein is of general usefulness on all turbomachines the use of the terms turbine or machine will be treated as interchangeable with the term turbomachine.

The blades of a typical turbomachine are moving at a high rotational speed and are subjected to severe stresses by fluid flow as well as centrifugal force in normal operation. In addition, certain environmental conditions provide hazards for blade damage. Two obvious examples of hazardous environment are the compressor section of a jet engine which is subject to the ingestion of foreign objects, and turbine uses wherein the blades are subjected to a corrosive atmosphere which reacts with the surface of the blades. The present invention makes it possible to detect cracks and other flaws in the blades of a high speed turbine while it is operational whether it be in flight or on the ground. The detection can be made sensitive enough that flaws can be observed hours before they cause serious damage to the machine.

With the increase of jet engines being used for commercial and military aircraft a system for detecting flaws in turbine blades while the aircraft is in operation is extremely desirable. The system of the present invention provides a means for low cost, high reliability detection of flaws in turbines while at operational speeds.

The principal object of the present invention is to provide a system for detecting flaws or damage in turbine blades.

Another object of the present invention is to detect misalignment or wobble in the rotors of turbine machines.

Still another object of the present invention is to provide a system for simultaneously detecting bending and twist in turbine blades together with any wobble in the rotation of the rotor itself.

Still a further object of the present invention is to detect damage caused by foreign objects ingested into the turbine of a jet engine.

Figure 2:
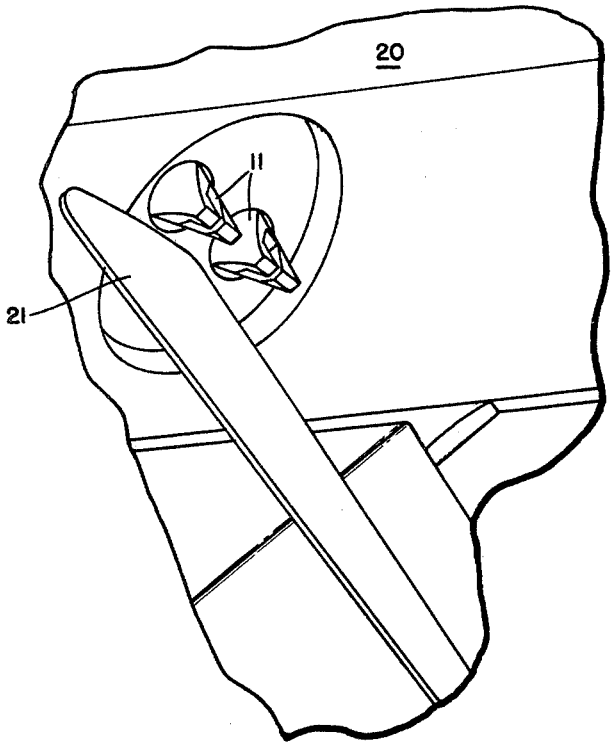
Figure 3:
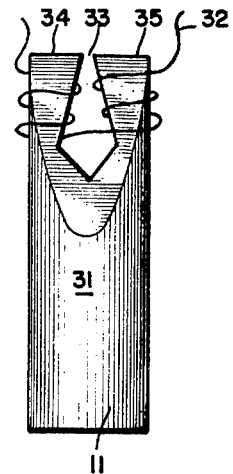

These and other objects of the present invention will be more clearly understood with the preferred embodiments and by reference to the following detailed description in connection with the drawings wherein:

FIGURE 1 is a schematic of the system;
FIGURE 2 is a perspective view of two transducers mounted in a turbomachine;
FIGURE 3 shows one embodiment of the transducer.

Briefly, FIGURE 1 teaches a preferred embodiment of the invention. The system 10 shown in FIGURE 1 is made up of detecting means 11 connected to a comparison circuit 13 which in turn is connected to a display device 14. The detecting means 11 are preferably two magnetic transducers of identical construction. They are positioned in the housing of the turbomachine as shown in FIGURE 2. The positioning of the transducers is such that when the tip of a blade on a rotor is placed directly under one transducer another point on the same tip will fall directly beneath the second transducer. Thus, the two transducers are laterally offset with respect to the direction of rotation of the turbine blades. When the transducers 11 are activated they create eddy currents in the blade directly below them. The currents in the blade in turn affect the current in the windings of the two transducers 11. The effect on the transducer coils is analyzed by the comparison circuit 13. The analysis made by the comparison circuit 13 is then transmitted to the display device 14.

As described briefly above the system 10 shown in FIGURE 1 includes detecting means in the form of transducers. One preferred embodiment of the construction of transducers 11 is shown in FIGURE 3. Each transducer 11 is made up of a ferrite core 31 having poles 34, 35 and coils 32. A gap 33 is provided between poles 34 and 35. In this embodiment the transducers act as both the transmitter device and the receiver device for currents induced in the tips of turbine blades.

Another embodiment of magnetic transducer which falls within the scope of the invention is a single pole transducer. This embodiment takes the form of a single pole transducer taking the place of one of the transducer poles 34 or 35 of FIGURE 3 and acting as an active source for inducing current into the blade. A second single pole transducer separate and distinct from the first is positioned as a pickup or receiving device. Variations on this system include but are not limited to a single transducer of the single pole variety being used as both the active source and the pickup device for the reflected signal. These variations depend on the various parameters of the particular machine which is to be monitored by the system.

Other forms of detection means employing nonmagnetic transducers are also within the scope of this invention. Examples of these other types of detectors that might be used are capacitive detectors, acoustic detectors and optical detectors. In terms of reliability, simplicity and cost the magnetic transducer type of detector appears to be better adapted to the detection of flaws in jet engines and high speed turbines.

The transducers described above are positioned in the shroud or case above a row of blades in a turbomachine. Two sets of transducers or two transducers depending on the variety employed are fixed above a single row of blades and spaced laterally with respect to the direction of rotation of the turbine at the opposite edges of the turbine blades in a row. The particular location of the transducers and the size of the gap are more clearly described hereinafter.

In the preferred embodiment shown in FIGURE 1 the comparison circuit is a bridge circuit 13 having arms composed of resonant elements. The detectors 11 are connected into parallel branches of the bridge circuit 13 and are themselves parallel with capacitors 15 and 16 in each branch. The circuit also contains appropriate resistance elements. One of the capacitors 16 is variable so that the system can be balanced. As described hereinafter particular circuit elements such as capacitors 15, 16 and resistance values are a function of the type of turbomachine and of the speed at which it will rotate for the particular application. The capacitors 15 and 16 are selected for each application so that the system may be tuned to a resonant frequency most sensitive for detection at the operational speed of the intended machine.

In the embodiment shown the bridge circuit 13 is also a transmitting circuit which induces currents into the tips of the blades. The current source may be an oscillator 17 as shown in FIGURE 1 which operates at the desired frequency for the particular application. Factors affecting the selection of frequency will be discussed in more detail hereinafter. In the embodiment shown the transducers 11 act as active sources for inducing currents into the tips of passing blades. The same transducers 11 also act as pickup or detection devices providing input for the circuit 13 which is a function of the current induced in the turbine blades. Under normal circumstances where no blades are bent or twisted the input to circuit 13 from transducers 11 should be equal. The net result on the operation of the circuit would therefore be zero. If a blade should be bent or twisted the input caused by the blade passing under the transducers 11 will vary from the normal input of a properly positioned blade causing a pulse. For example if the blade should be bent the pulse caused by the passage of the blade under transducers 11 will be either advanced or delayed in time. If the blade were twisted the input from transducers 11 would no longer correspond in time since one portion of the blade will reach one transducer before the corresponding portion reaches the other transducer. The only requirement of the circuit 13 therefore is to be able to distinguish these types of variations within the limit precribed for the particular machine. The value of Q is not critical for this type of detection inasmuch as the system detects blade displacement and not the flaw itself. Many variations in the structure of circuit 13 are possible without departing from the scope of the invention.

The circuit 13 compares the signals received and produces an output on display means 14. If the display means 14 is in the form of an oscilloscope the normal pattern is an envelope of a relatively fixed height having no peaks or valleys. The height of the normal envelope can be regulated by adjusting the amplitude of the oscillator either with a blade present or without. Deviations from the normal appear then as peaks in an otherwise relatively flat display. It is also possible to design the circuit so that the deviations appear as depressions in the envelope without departing from the scope of the invention. The display device could also take on many other forms without departing from the scope of the invention. Any display device employed would be inserted at the point indicated in a circuit such as shown in FIGURE 1.

FIGURE 2 shows a small portion of a turbine case or shroud 20. The transducers 11 operationally mounted to oppose the tips of rotor blades 21 as they pass. As can readily be seen a line drawn through the centers of the two transducers would form the same angle with the turbine axis as does the blade when it is in register with the transducers. In other words the blade in its normal rotation will pass the two transducers simultaneously. Only one such pair of transducers is necessary to detect flaws in a single row of rotating turbine blades. The system could, however, be applied to each row in a turbine if this type of detection is deemed necessary. If the system is to be used for jet aircraft as a detector for foreign object damage, the transducers would probably be placed only over the first two or three rows of the compressor. Foreign object damage is most severe in the first two or three rows of blades. Detection of damage in the first three rows would probably be a sufficient safety factor for failure in a jet engine. Fatigue or corrosion failure is not as localized as foreign object damage. In order to detect all cracking it would be necessary to supply detection means on each row of the turbine rotor.

In addition to the detection of twisting or bending in individual blades the present invention will also detect any serious blade vibration or stall condition in in the rotor such as might be caused by bearing failure. The mechanism for detecting vibration is essentially the same as for twisting or bending of the blades. A loss of coincidence of the impulses in the two transducers 11 results from misalignment of the blade as it passes the transducers. In the case of a bearing failure resulting in orbiting of the rotor the envelope which was described as being of constant amplitude under normal conditions would include cyclic variations similar to a sine wave. These variations are caused by the rotor itself orbiting slowly off center causing the blade passing under the detection device to pass at varying distances as the rotor circulates around the orbit.

As mentioned briefly above the variatioins in the parameters built into a given system are almost unlimited. One important parameter which should be determined is the oscillator frequency to be employed. The desired frequency is a function of the number of blades and the rotational speed of the turbine. As a rule the frequency should be a minimum of ten times the revolutions per second times the number of blades. Lower frequencies will produce poorer resolution. It follows from the above that the desired frequency for satisfactory resolution increases with the rotational speed of the turbomachine to be monitored. Other parameters are the gap width and center to center spacing for the transducers. The gap width for optimum response is a function of the tip to shroud spacing and tolerance, the width of the blade at its tip, the length of the blades and the number of blades, among others. The spacing between the two transducers is critical to the detection of blade twist. For maximum sensitivity the transducers should be placed over he leading and trailing edges of the blades. The spacing between the blade tip and the transducer poles preferably should be equal to or smaller than the gap width. The induced currents on the blade tip drop off at a rate proportionate to the third power of the ratio between he distance from the transducer to the blade tip and the gap width at separations greater than a gap width. Therefore, for transducer to blade spacings larger than the gap width the induced signal may not be strong enough to be detected above the spurious signals picked up by the transducers.

By way of example the considerations which would go into the minimum frequency selection and transducer placement are illustrated for the case of a J-47 engine. If the first stage contains 40 blades and the blades are approximately 1¼ inches edge to edge at the tip, the following parameters would be employed. Assuming a full speed of 7500 r.p.m., the r.p.s. is 125. The minimum satisfactory frequency is 50,000 c.p.s. or $125_{RPS} \times 40 \times 10$. An effective gap width is 0.125 inch which is comparable to the tip to shroud clearance. Center to center spacing for the two transducers is approximately 1 inch to take advantage of most of the 1¼ inch width of the blades.

A J-47 engine is of sufficient precision to permit the spacing between blade tip and transducer of the order of 30 mils.

The parameters presented above are for the first stage of a J-47 engine. The size of blades in successive stages decreases. Thus the detector should be optimized for each different stage. The previous example is presented to show one specific embodiment of the present invention and is not intended to limit the scope of this disclosure in any way.

The statement referring to the angular position of the centerline between the transducers implies a flat turbine blade. If the blade is curved the transducers are still placed so that the respective points on the tip pass the two transducers simultaneously.

The application of the system disclosed herein to all types of turbines can readily be accomplished by one skilled in the art. Certain design factors are necessary to adapt the system to a particular use. These modifications in no way affect the operation of the system and would not depart from the scope of the invention.

We claim as our invention:

1. A system for detecting irregularities in the blades of a turbomachine comprising,
    detecting means mounted on said turbomachine, said detecting means including two transducers positioned in proximity with one row of turbine blades so that each blade passes directly in front of said transducers during rotation, said two transducers being laterally offset with respect to said row of turbine blades at an angle so that a line connecting said two transducers corresponds to the angle of each blade when in register with said transducers, whereby two points on a given blade pass the respective transducers simultaneously, electrical means operatively associated with said transducers for comparing signals received by said transducers, and display means connected to said electrical means, whereby deviations of blade positions can be observed on said display means during the operation of said turbomachine.

2. The system defined in claim 1, wherein said detecting means comprises two magnetic transducers.

3. The system defined in claim 2, wherein said electrical means includes a power source connected to said transducers to induce currents into the tip of a passing turbine blade as well as to detect the impedance reflected from said blade.

4. The system defined in claim 1, wherein said transducers are positioned over the tips of a row of blades.

5. The system defined in claim 1, wherein said electrical means includes an active power source.

6. The system defined in claim 1, wherein said transducers are positioned respectively above the leading and trailing edges of said row of blades.

7. The system defined in claim 1, wherein said electrical means includes a bridge circuit and wherein said transducers are positioned in parallel arms of said bridge circuit.

8. In a turbomachine having a rotor and a stator, said rotor and stator each having at least one row of blades mounted in operative relationship the improvement comprising means responsive to the time position of each blade mounted on said machine for simultaneously detecting any unusual blade position in the rotor while said machine is rotating at operational speed, said means having two points of detection laterally offset with respect to the direction of rotation of said row of blades.

9. The method of detecting twist and bend in turbine blades during operation of the turbine comprising,
    inducing current into a passing blade tip,
    simultaneously detecting the passage of two points on each blade tip by the impedance reflected from said blade tip, said two points being spaced laterally with respect to the direction of rotation of said turbine,
    comparing the two detected reflected impedances, and observing the results of said comparison on a display device.

References Cited

UNITED STATES PATENTS 2,575,710 11/1951 Hardigg.
2,805,677 9/1957 Baird.

ALFRED E. SMITH, Primary Examiner

U.S. Cl. X.R.

73—70; 340—199